Patented Feb. 21, 1950

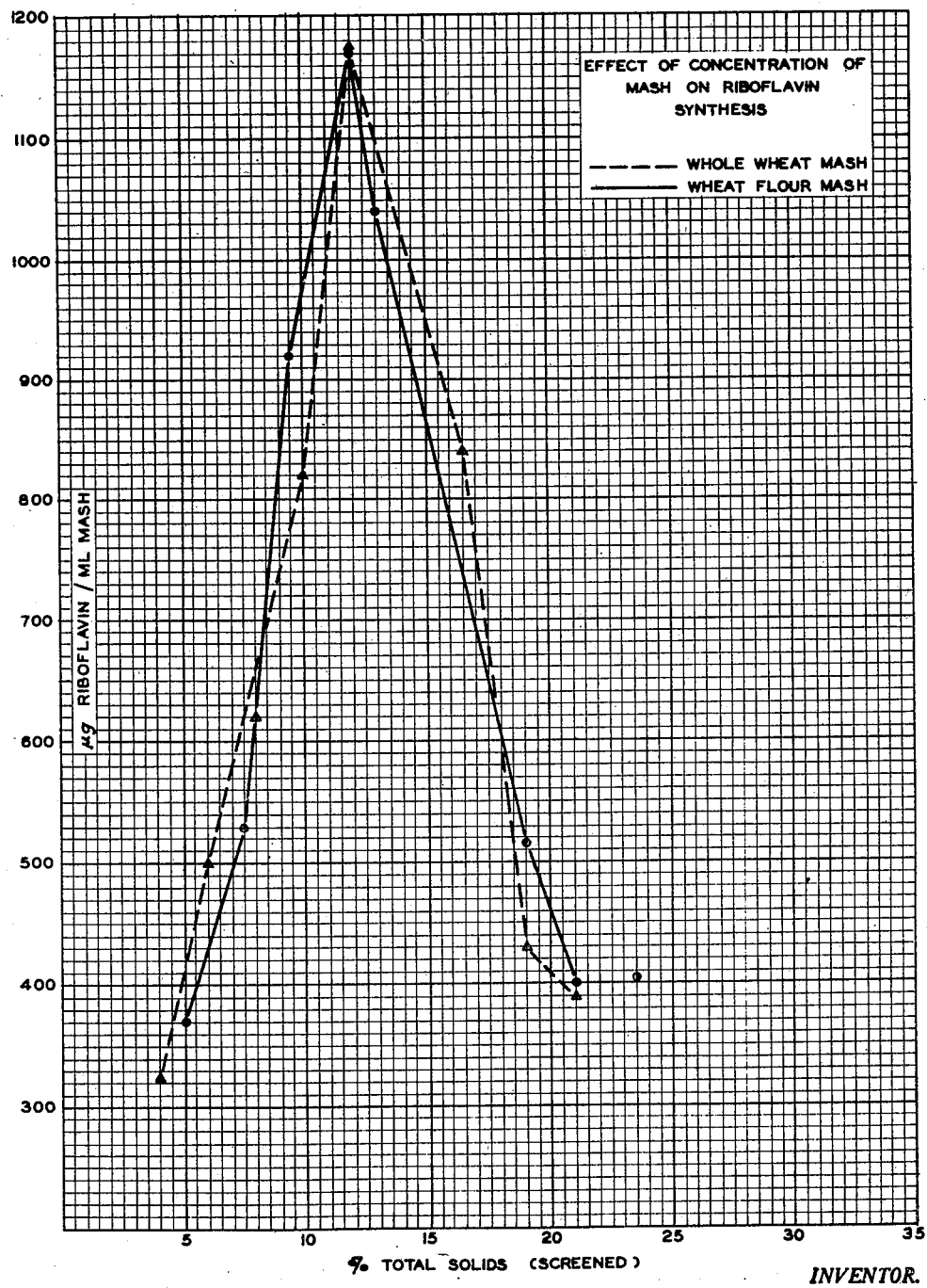

2,498,549

UNITED STATES PATENT OFFICE 2,498,549

PRODUCTION OF RIBOFLAVIN

Robyn M. James, Terre Haute, Ind., assignor to Commercial Solvents Corporation, Terre Haute, Ind., a corporation of Maryland Application October 13, 1945, Serial No. 622,216

8 Claims. (Cl. 195—34)

This invention relates to a method for producing riboflavin and more particularly to a method for producing high yields of riboflavin by the propagation of the organism Eremothecium ashbyii on malted wheat mashes as described hereinafter.

It has been known that the organism Eremothecium ashbyii would synthesize riboflavin when propagated on various solid and liquid media including mixtures of glucose with peptone or beef bouillon, waste residues from certain industrial fermentations and the like.

In the prior art fermentation processes, yields of riboflavin were low, usually considerably below 500 micrograms of riboflavin per milliliter of culture liquor, under the best conditions of operation.

I have now found that relatively much higher yields of riboflavin considerably in excess of 500 micrograms per milliliter of culture medium can be obtained by the propagation of the organism Eremothecium ashbyii on nutrient media in accordance with my invention wherein highly malted comminuted ground or milled whole wheat mashes are used as the nutrient medium under controlled conditions of concentration and particle size.

In carrying out my invention, ground whole wheat or milled wheat flour is cooked with sufficient water to make a flowable mash together with the usual quantity of barley malt—about 1% based on the wheat solids—necessary for thinning. The malted mash is cooked until fluid. The mash is then heated, for about thirty minutes, for example, to above about 121° C. as by the application of about 15 lb. per square inch steam pressure, to assist in solubilizing the grain components. It is then cooled somewhat, usually to a temperature of about 65° C. At this point, I add an additional quantity of barley malt over and above the usual 1% required for "thinning" the mash as brought out above. For best results and highest riboflavin yields, I have found it desirable to add an additional minimum of barley malt of around 7%, bringing the minimum total of malt used to at least about 8% based on the total wheat solids in the mash. Additional quantities of malt may be used, but apparently afford little if any additional advantage over the necessary minimum, so that I prefer to use a quantity of malt only slightly in excess of the necessary minimum, for example, a quantity totalling between about 8 and 10% on the solids basis above described.

After the additional malt has been thoroughly incorporated, the mash is incubated at about 52–55° C. for a sufficient period for malting to take place. In the case of a ground whole wheat mash, a period of about 1 to 2 hours is usually sufficient. A longer period of 12–18 hours is required when wheat flour is used as the mash constituent. After incubation, the mash is steamed as described above to solubilize the grain components.

If oversize particles are present, the malted mash is then screened through a 20 mesh per inch screen to remove particles of greater size than those which pass readily through such a screen. The solids concentration of the mash as originally prepared is usually in the neighborhood of 20% or slightly greater. I have found that the concentration of the mash is an important determining factor in securing high riboflavin yields according to my invention. Accordingly the mash is adjusted before fermentation conveniently at this point to a solids concentration between about 9 and 17%, preferably to a point intermediate between these two extremes as explained hereinafter. The pH of the mash is then preferably adjusted for example by the use of sodium carbonate to a point in the neighborhood of about 5.8 to 6.2. Values of pH somewhat above this range give good yields of riboflavin, up to about pH 7, but at the higher levels there is danger of breakdown of the wheat components. Moreover, the buffering effect of the grain itself appears to be such that the pH of the mash tends to return to within the range of 5.8 to 6.2 upon sterilization of the mash.

After adjusting the pH, the mash is sterilized in any desired manner, for example, by autoclaving at 121° C. (15 lb. steam pressure) for thirty minutes or longer. The mash is then cooled to about 30° C. and inoculated with an active culture of Eremothecium ashbyii. The culture medium or mash is then incubated at a temperature favorable to the growth and riboflavin production of the organism, preferably between about 28° C. and 30° C. until the desired riboflavin yield has been obtained. The maximum yield is usually attained in from seven to fourteen days. Oxygen is supplied to the mash during growth of the organism by any desired means, as by shaking or rotating the vessel in the presence of air, or by forcing air or other oxygen containing gas into the culture medium, for example, through porous tubes located within the culture medium.

When the desired riboflavin yields have been obtained, the fermentation is discontinued and the riboflavin recovered by known methods, either as pure riboflavin, or as dried crude concentrates, including all or part of the culture solids, or in other suitable form.

In obtaining the high riboflavin yields according to my invention, I have found that the mash should be largely in solution or in a suspension of solids whose particle size is relatively fine. For this reason it is important that the wheat should be ground or otherwise comminuted to a relatively fine state of subdivision, and the fermentation should be carried out in a mash, all of whose particles will pass at least a 20 mesh per inch screen, and preferably should be fine enough so that at least about 80% of the mash solids will pass a 40 mesh per inch screen.

By comminuted whole wheat, I mean to include both whole wheat flour produced by the conventional milling process and also that produced by other comminuting processes as, for example, by hammer milling, roller milling or other suitable grinding method provided the fineness limitations of the resulting mode are within the range specified above.

The solids concentration of the culture mash is an important factor in obtaining high yields of riboflavin. For any given mash there appears to be a relatively narrow range of total solids concentrations within which highest yields of riboflavin are obtained, and this optimum range lies between about 9 and 17% initial total solids, the peak usually appearing at a point intermediate these two extremes as illustrated by the examples given below, and by the figure which represents data from Examples I and II plotted in the form of a graph.

In the figure, the abscissa represents the initial solids concentration of the mash, the ordinate represents the number of micrograms of riboflavin per milliliter of mash on the 10th day after inoculation. According to this figure, the maximum riboflavin production in micrograms per milliliter of mash occurs at a solids concentration of mash of about 12% solids, and concentrations between about 10 and 14% solids give exceptionally high yields of riboflavin usually in excess of 900 micrograms per ml. of culture liquor. At concentrations between about 9 and 17% solids the yields are over 700 micrograms per ml. of culture liquor and I therefore prefer to carry out my fermentation process within this range.

The use of barley malt in quantities greater than that necessary for "thinning" the mash appears to be important in obtaining high yields of riboflavin, for example, a wheat flour mash prepared as described, but containing only 1% malt produced a yield of only 325 micrograms of riboflavin per ml. of mash, after 96 hours aerated culture, while the same mash to which an additional 7% barley malt had been added yielded 613 micrograms of riboflavin after the same period of incubation.

The malting is carried out in the usual way by grinding the dehulled dried malted barley and adding it to the slurried ground wheat or wheat flour in the proportions described.

The inoculum of *Eremothecium ashbyii* is prepared in the usual way by transferring spores of the culture to a small quantity of a nutrient growth medium and transferring the vegetative culture several times if desired, to larger vessels, a culture which has undergone four such transfers usually being satisfactory. Each transfer is often referred to as a "generation."

The following specific examples will further illustrate my invention.

EXAMPLE I

A series of eight mashes were prepared from commercial whole wheat flour, by cooking the quantity of flour indicated in the table below with a quantity of barley malt equivalent to 1% of the weight of the flour solids and sufficient water to make a flowable mash. The temperatures of the mashes were then raised to 121° C. for thirty minutes to assist in solubilizing the grain components and the mashes were then cooled to 65° C. and additional barley malt, equivalent to an additional 9% on the total wheat solids added, bringing the total malt to 10% in each case. The mashes were then malted by incubation at 52 to 55° C. overnight, then steamed thirty minutes. The mashes were screened through a 20 mesh per inch screen, and the total solids of each mash derived from the whole wheat and added barley malt were determined. The pH of each mash was adjusted to 5.9 to 6.1 with sodium carbonate then each mash was sterilized by autoclaving at 121° C. (15 lb. steam pressure) for thirty minutes. The mashes were cooled to 30° C. and each was inoculated with one ml. of a fourth "generation" active culture of *Eremothecium ashbyii*. The cultures were maintained at a temperature of 29–30° C. for a period of 10 days during which time they were aerated by shaking the partially filled vessels in which they were contained. After fermentation the mashes were assayed for riboflavin content with the results indicated in Table I below.

Table I

[Riboflavin production by commerical wheat flour-barley malt mashes at various solids concentrations after 10 days aerated culture at 29–30° C.]

| Mash Number | Wheat Flour, g./l. | Barley Malt, g./l. | Initial Percent Total Solids in Mash | Per cent Maltose | Riboflavin μg. per ml. |
|---|---|---|---|---|---|
| 1 | 50 | 5 | 4.84 | 3.47 | 365 |
| 2 | 75 | 7.5 | 7.27 | 4.90 | 525 |
| 3 | 100 | 10.0 | 9.6 | 6.63 | 920 |
| 4 | 125 | 12.5 | 11.95 | 8.45 | 1,170 |
| 5 | 150 | 15.0 | 13.27 | 9.80 | 1,040 |
| 6 | 200 | 20.0 | 18.86 | 13.85 | 515 |
| 7 | 225 | 22.5 | 20.68 | 15.15 | 400 |
| 8 | 250 | 25.0 | 23.59 | 18.10 | 405 |

EXAMPLE II

A similar series of mashes was prepared and fermented as described under Example I using whole wheat which had been ground in a hammer mill instead of the commercial milled whole wheat flour used in the previous runs. The results are given in Table II below:

Table II

[Riboflavin production by hammer milled whole wheat-barley malt mashes at various solids concentrations after 10 days aerated culture at 29–30° C.]

| Mash Number | Ground Whole Wheat g./l. | Barley Malt, g./l. | Initial Percent Total Solids in Mash | Per cent Maltose | Riboflavin μg. per ml. |
|---|---|---|---|---|---|
| 1 | 50 | 5 | 3.91 | 3.47 | 325 |
| 2 | 75 | 7.5 | 5.89 | 4.90 | 500 |
| 3 | 100 | 10.0 | 8.0 | 6.63 | 620 |
| 4 | 125 | 12.5 | 10.09 | 8.45 | 820 |
| 5 | 150 | 15.0 | 12.23 | 9.80 | 1,175 |
| 6 | 200 | 20.0 | 16.46 | 13.85 | 840 |
| 7 | 225 | 22.5 | 18.97 | 15.15 | 430 |
| 8 | 250 | 25.0 | 21.10 | 18.10 | 390 |

While the above describes the preferred embodiments of my invention, it will be understood that departures may be made therefrom within the scope of the specification and claims.

What is claimed is:

1. In the manufacture of riboflavin, the process which comprises preparing a mash from comminuted whole wheat, adding a sufficient quantity of barley malt, at least about 8 per cent based on the weight of the wheat solids, to enable the mash to be malted, heating and malting the resulting mash, preparing from the malted mash a mash to be fermented containing from about 9 to 17 per cent of solids derived from said whole wheat and barley malt, inoculating said mash with a culture of *Eremothecium ashbyii*, fermenting the mash under conditions favoring growth and riboflavin production of said organism while supplying oxygen to the mash and recovering the riboflavin thereby produced.

2. The process of claim 1 wherein the mash to be fermented contains from about 10 to 14 per cent total solids derived from said whole wheat and barley malt.

3. The process of claim 1 wherein during the fermentation the pH of the mash is maintained at from about 5.8 to 6.2 and the temperature at from about 28° to 30° C.

4. The process of claim 1 wherein the quantity of barley malt solids incorporated is from about 8 to 10 per cent based on the wheat solids.

5. In the manufacture of riboflavin, the process which comprises preparing a mash to be fermented containing from about 9 to 17 per cent of solids derived from a malted mash of comminuted whole wheat containing before malting from about 8 to 10 per cent of barley malt solids based on the whole wheat solids, inoculating said mash with a culture of *Eremothecium ashbyii*, fermenting the mash while supplying oxygen thereto and while maintaining conditions favorable to the growth and riboflavin production of said organism, and recovering the riboflavin thereby produced.

6. The process of claim 5 wherein during the fermentation the pH of the mash is maintained at from about 5.8 to 6.2 and the temperature at from about 28° to 30° C.

7. The process of claim 5 wherein the mash to be fermented contains from about 10 to 14 per cent total solids.

8. In the manufacture of riboflavin, the process which comprises solubilizing a mash of comminuted whole wheat by adding a small amount of barley malt and heating, adding an additional quantity of barley malt sufficient to make the total added from about 8 to 10 per cent based on the whole wheat solids, malting the resulting mash, screening the malted mash to remove particles failing to pass a 20 mesh screen, adjusting the water content of the mash if necessary to produce a total solids content, derived from said wheat and barley malt, of from about 10 to 14 per cent, sterilizing the mash, inoculating it with a culture of *Eremothecium ashbyii* and fermenting it at a temperature of from about 28° to 30° C. and at a pH of from about 5.8 to 6.2 while supplying oxygen to the mash, and recovering the riboflavin thereby produced.

ROBYN M. JAMES.

REFERENCES CITED

The following references are of record in the file of this patent:

UNITED STATES PATENTS

| Number | Name | Date |
| --- | --- | --- |
| 2,374,503 | Rudert | Apr. 24, 1945 |
| 2,400,710 | Piersma | May 21, 1946 |

OTHER REFERENCES

Schopfer, Helvetia Chimica, Acta V. XXVII, published August 1, 1944, page 1021.

Leach, Food Inspection and Analysis, 4 edition (1920), Wiley, page 761.